United States Patent Office 3,328,344
Patented June 27, 1967

3,328,344
PHENYLCHLOROPHENYL ORGANOSILICON
COMPOUNDS
Christian R. Sporck, Burnt Hills, N.Y., assignor to General Electric Company, a corporation of New York
No Drawing. Filed Dec. 18, 1961, Ser. No. 160,265
4 Claims. (Cl. 260—46.5)

This invention relates to cyclic polydiorganosiloxanes in which the organo groups are phenyl radicals and chlorophenyl radicals and to polymers prepared from these cyclic materials.

Cyclic polydiorganosiloxanes in which all of the organic groups are phenyl radicals or in which all of the organic groups are chlorophenyl radicals are known in the art. Also known in the art are homopolymers prepared by the rearrangement and condensation of cyclic polydiorganosiloxanes in which all of the organic groups are phenyl or in which all of the organic groups are chlorophenyl. While such homopolymers have certain desirable properties, the fact that all of the organic groups are phenyl or chlorophenyl groups tends to render the polymers extremely hard and intractable and difficult to form into the desired shape by mechanical means. While copolymers can be prepared by the rearrangement and condensation of a mixture of a cyclic diphenylsiloxane and a cyclic bis-(chlorophenyl)siloxane, these copolymeric materials still exhibit the undesirable properties of the homopolymers described above. This is believed to be due to the different reactivities of the two types of cyclic polydiorganosiloxanes which result in a block copolymer containing large blocks of diphenylsiloxane units and large blocks of bis-(chlorophenyl)siloxane units.

The presence of both silicon-bonded phenyl groups and silicon-bonded chlorophenyl groups in organopolysiloxanes is desirable since both of the groups contribute to the resistance to ionizing radiation of these materials. In addition, the silicon-bonded chlorophenyl groups provide a high degree of resistance to aliphatic hydrocarbon solvents in the final polymer. This resistance to hydrocarbon solvents is particularly desirable where the polymer is to be employed as an encapsulant for articles such as electronic components which are to be used in environments where both ionizing radiation and aliphatic hydrocarbon solvents are present.

The present invention relates to a new class of cyclic polydiorganosiloxanes containing both silicon-bonded phenyl groups and silicon-bonded chlorophenyl groups, which cyclopolysiloxanes are useful for the formation of high molecular weight thermoplastic linear polydiorganosiloxanes which can be readily molded into the desired shape to form articles which are resistant to changes caused by ionizing radiation and which are resistant to the action of conventional aliphatic hydrocarbon solvents. The cyclic polydiorganosiloxanes of the present invention have the formula:

(1) 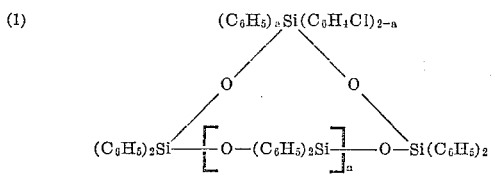

where $a$ and $n$ are whole numbers equal to from 0 to 1, inclusive. The present invention also relates to the process of preparing the cyclopolysiloxanes of Formula 1 and to polymers having the recurring structural units:

(2) 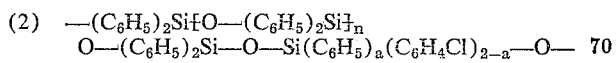

The cyclopolysiloxanes of Formula 1 are prepared by effecting reaction between a hydroxy chain-stopped polydiphenylsiloxane having the formula:

(3) 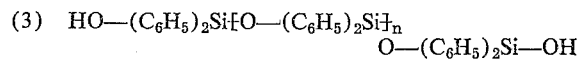

where $n$ is as previously defined, and a diorganodihalogenosilane having the formula (4) $(C_6H_5)_a(C_6H_4Cl)_{2-a}SiX_2$ where X is halogen, e.g., chlorine, bromine, etc., and preferably chlorine, and $a$ is as previously defined.

It is apparent that Formula 1 covers four types of cyclic polydiorganosiloxanes as well as the possible isomers of each type. These four cyclic diorganopolysiloxanes are chlorophenylpentaphenylcyclotrisiloxane; chlorophenylheptaphenylcyclotetrasiloxane; 1,1-bis-(chlorophenyl)-3,3,5,5-tetraphenylcyclotrisiloxane; and 1,1-bis-(chlorophenyl)-3,3,5,5,7,7-hexaphenylcyclotetrasiloxane. Because of the three possible positions of the chlorine atom attached to the nucleus of the silicon-bonded chlorophenyl radical, each of the four types of cyclic polydiorganosiloxanes described above can exist in the isomeric form corresponding to the o-chlorophenyl radical, the p-chlorophenyl radical, or the m-chlorophenyl radical. Preferably, the chlorophenyl radical attached to silicon is the p-chlorophenyl radical. The preferred specific cyclopolysiloxane within the scope of the present invention is 1,1-(bis - p - chlorophenyl) - 3,3,5,5 - tetraphenylcyclotrisiloxane having the formula:

(5) 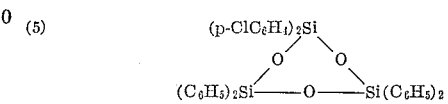

Within the scope of Formula 3 are two hydroxyl chain-stopped polydiphenylsiloxane, namely, tetraphenyldisiloxanediol-1,3 and hexaphenyltrisiloxanediol-1,5. Within the scope of Formula 4 are a number of diorganodihalogenosilanes which are generically described as phenylchlorophenyldihalogenosilanes and bis-(chlorophenyl)dihalogenosilanes. Because of the isomers of the chlorophenyl group, it is apparent that a number of different isomeric diorganodihalogenosilanes fall within the scope of Formula 4. Where the diorganohalogenosilane contains two silicon-bonded chlorophenyl groups, it is preferred that the two chlorophenyl groups be the same isomer.

The diorganodihalogenosilanes within the scope of Formula 4 are known in the art and can be prepared by the process described in Patent 2,894,012, Ramsden et al. This process comprises forming the Grignard reagent of a dihalo-substituted benzene and reacting this Grignard reagent with an appropriate chlorosilane or organochlorosilane. For example, the Grignard reagent of p-dichlorobenzene can be reacted with silicon tetrachloride to prepare bis-(p-chlorophenyl)dichlorosilane. As another illustration, the Grignard reagent of p-dichlorobenzene can be reacted with phenyltrichlorosilane to prepare phenyl-p-chlorophenyldichlorosilane. The properties of certain of the diorganodihalogenosilanes within the scope of Formula 4 are described by Herbert C Kaufman, Handbook of Organometallic Compounds, page 458, D. Van Nostrand, Inc., New York (1961).

The reaction to form the cyclic polydiorganosiloxane of Formula 1 theoretically involves one mole of the hydroxy chain-stopped material of Formula 3 and one mole of the diorganodihalogenosilane of Formula 4 and results in the formation of two moles of hydrogen halide. To facilitate the reaction, a hydrogen halide acceptor is employed. While the preferred hydrogen halide acceptor is pyridine, any organic tertiary amine such as triethylamine or N,N-dimethyl aniline can be employed. In theory, one mole of the hydrogen halide acceptor is required for each mole of hydrogen halide generated. While the theoretical ratio of reactants has been described above, the ratio of these ingredients can vary within wide limits. For example, the hydroxyl chain-stopped polydiphenylsiloxane of Formula 3 can be employed in an amount equal to form about 0.5 to 2 moles per mole of the diorganohalogenosilane of Formula 4. Preferably, the hydrogen halide acceptor is employed in excess, with there being from about 3 to 30 moles of hydrogen halide acceptor per mole of whichever of the other two reactants is present in the smaller amount. In the preferred embodiment of my invention, equimolar amounts of the hydroxyl chain-stopped material of Formula 3 and the diorganodihalogenosilane of Formula 4 are employed to reduce the formation of by-products. With equimolar amounts, the purification of the desired product is simplified since no significant amounts of unreacted starting materials are present in the reaction mixture.

Because the hydroxyl chain-stopped polydiphenylsiloxanes within the scope of Formula 3 and the cyclic polydiorganosiloxanes of Formula 1 are solid materials at room temperature, it is preferable to effect the reaction in the presence of a solvent which is inert to the reactants under the conditions of the reaction and which is a solvent for all of the reactants and reaction products except the hydrogen halide acceptor. Suitable solvents include, for example, tetrahydrofuran, tetrahydropyran, n-hexane, xylene, toluene and diethyl ether. In general, the solvent is employed in the ratio of from about 1 to 50 parts by weight based on the total weight of the other components of the reaction mixture.

Because the reaction to form the cyclic polydiorganosiloxane of Formula 1 proceeds at a satisfactory rate at room temperature, it is preferred to conduct the reaction at such temperature, i.e., a temperature of from about 15 to 25° C. However, it should be understood that the use of elevated temperatures, e.g., temperatures from about 25 to 120° C. is not precluded. Depending upon the proportions of ingredients, the reaction temperature and the particular solvent employed, the time required for effecting reaction between the hydroxyl chain-stopped polydiphenylsiloxane of Formula 3 and the diorganodihalogenosilane of Formula 4 can vary from about one-half to 24 hours or more. After the reaction is completed, the reaction mixture consists of a solution of the desired cyclic polydiorganosiloxane of Formula 1 together with any unreacted starting materials and a precipitate of the hydrogen halide acceptor. This precipitate is filtered from the reaction mixture and the resulting filtrate is stripped of solvent and volatile starting materials, resulting in a crude product. The crude product is recrystallized from a suitable solvent such as benzene, cyclohexane or hexane to produce the purified cyclic polydiorganosiloxanes of Formula 1.

Polymeric materials consisting essentially of the recurring units of Formula 2 can be formed by the homopolymerization of the cyclic polydiorganosiloxanes of Formula 1 by several methods. For example, the cyclic polydiorganosiloxanes can be polymerized by heat alone by maintaining the cyclic siloxane at a temperature of from about 250 to 350° C., preferably in an inert atmosphere such as nitrogen or noble gas, for about 15 minutes to one hour during which time one of the siloxane bonds of the cyclic polydiorganosiloxane opens up and permits a conventional rearrangement and condensation to form a high molecular weight thermoplastic linear polymeric diorganosiloxane which is a hard, solid polymer at room temperature and a viscous moldable gum at 50 to 100° C. This polymer is soluble in benzene and toluene. This polymer can contain from about 20 to 10,000 or more and preferably from about 100 to 10,000 or more of the units of Formula 2, depending upon the reaction temperature and time. In general, these polymers have an intrinsic viscosity of the order of from about 0.25 to 4.0 deciliters per gram when measured in toluene at 30° C. and have a molecular weight of the order of from about 10,000 to 5,000,000 or more.

Another and preferred method of forming the polymers consisting essentially of the recurring units of Formula 2 is by the catalytic rearrangement and condensation of the cyclic polydiorganosiloxanes of Formula 1. This rearrangement and condensation is effected in the presence of a typical alkaline organopolysiloxane rearrangement and condensation catalyst such as potassium hydroxide. In order to insure thorough mixing of the rearrangement and condensation catalyst with the cyclic diorganopolysiloxanes and to permit the rearrangement and condensation at a relatively low temperature, the rearrangement and condensation is effected in the presence of a solvent which is inert to the reactants under the conditions of the reaction. Satisfactory solvents are any of the conventional aromatic solvents such as toluene, xylene, mesitylene, diphenyl ether, etc. In general, the amount of solvent employed is kept as low as possible, only sufficient solvent being employed to provide a substantially saturated solution of the cyclic polydiorganosiloxane of Formula 1. In general, these saturated solutions contain from about 0.5 to 1.0 part solvent per part of the cyclic polydiorganosiloxane. The rearrangement and condensation catalyst is conventionally added to the cyclic polydiorganosiloxane solution as a solution in octamethylcyclotetrasiloxane, for example, as a solution containing from about 0.1 to 1 percent by weight of potassium hydroxide. In general, the amount of potassium hydroxide added is sufficient to provide from about 10 to 100 parts by weight potassium hydroxide per million parts by weight of the cyclic polydiorganosiloxane. The catalytic polymerization is effected by heating the catalyzed solution at a temperature on the order of from about 110 to 170° C., with polymerization being completed in a time which can vary from a few seconds up to one hour or more. After the polymerization is completed, the solvent is stripped from the reaction mixture, resulting in a polymer identical to the polymer prepared by the thermal polymerization previously described.

In addition to forming polymers of the cyclic polydiorganosiloxanes of Formula 1 alone, copolymers can be prepared by reacting these cyclic polydiorganosiloxanes with other cyclic polydiorganosiloxanes. Preferably, in preparing these copolymers, the base catalyzed rearrangement and condensation reaction in solution described above is employed.

Suitable cyclic polydiorganosiloxanes for copolymerization with the cyclic polydiorganosiloxanes of Formula 1 include, for example, hexaphenylcyclotrisiloxane, hexamethylcyclotrisiloxane, octaphenylcyclotetrasiloxane, or octamethylcyclotetrasiloxane; 1,1 - dimethyl - 3,3,5,5-tetraphenylcyclotrisiloxane which is described and claimed in my copending application Ser. No. 160,264, now abandoned; 1,1 - dimethyl - 3,3,5,5,7,7-hexaphenylcyclotetrasiloxane which is described and claimed in the copending application of Howard A. Vaughn, Jr., Ser. No. 160,267, now abandoned; triphenylsiloxy pentaphenylcyclotrisiloxane or triphenylsiloxy heptaphenylcyclotetrasiloxane which are described and claimed in my copending application Ser. No. 160,263; 1 - phenyl - 1 - vinyl-3,3,5,5-tetraphenylcyclotrisiloxane or 1 - phenyl - 1-vinyl-3,3,5,5,7,7 - hexaphenylcyclotetrasiloxane which are described and claimed in my copending application Ser. No. 160,268; 1 - methyl - 1 - vinyl - 3,3,5,5 - tetraphenylcyclotrisiloxane or 1 - methyl - 1 - vinyl - 3,3,5,5,7,7-hexaphenylcyclotetrasiloxane which are described and claimed in my copending application Ser. No. 160,269; methylpentaphenylcyclotrisiloxane or methylheptaphenylcyclotetrasiloxane which are described and claimed in my copending application Ser. No. 160,270; a compound such as beta-cyano-ethylpentaphenylcyclotrisiloxane or 1 - (gamma-cyanopropyl) - 3,3,5,5,7,7 - hexamethylcyclotetrasiloxane which are described and claimed in my copending application Ser. No. 160,271; a compound such as 1,1-bis-(p-trifluoromethylphenyl)-3,3,5,5-tetraphenylcyclotrisiloxane which is described and claimed in my copending application Ser. No. 160,272; and the cyclic materials containing both siloxane linkages and silphenylene linkages in the ring which are described and claimed in my copending application Ser. No. 160,262. All of the aforementioned copending aplications are filed concurrently herewith and assigned to the same assignee as the present invention.

The copolymerization of the cyclic siloxanes of Formula 1 with the aforementioned other cyclic polydiorganosiloxanes results in high molecular weight linear polydiorganosiloxanes which are soluble in solvents such as benzene and toluene. The procedure employed in preparing the copolymers of the cyclic polydiorganosiloxanes of Formula 1 with other cyclic polydiorganosiloxanes is identical to the procedure employed in preparing the polymers consisting of the recurring units of Formula 1. The ratio of the various cyclic polydiorganosiloxanes used in the preparation of the linear copolymers can vary without limit, depending upon the characteristics desired in the final copolymeric material. Suitable mixtures of cyclic siloxanes can contain from 1.0 to 99 percent by weight of the cyclic materials of Formula 1 based on the weight of the total cyclic siloxanes in the mixture.

Because the polymers consisting essentially of the structural units of Formula 2 contain an aromatic substituent on each silicon atom, it is not possible to cross-link these materials by conventional means such as ionizing radiation or free-radical chemical catalysts. However, many of the copolymers prepared by the rearrangement and condensation of a mixture of the cyclic polydiorganosiloxanes of Formula 1 with other cyclic polydiorganosiloxanes can be cross-linked by conventional means. For example, copolymers containing at least one vinyl group per 100 silicon atoms or containing at least one pair of adjacent methyl-containing silcon atoms per 100 silicon atoms can be cross-linked with either ionizing radiation or by chemical means.

Because the copolymers of the present invention usually have a high phenyl content, the irradiation doses are generally higher than the doses employed in cross-linking conventional methyl silicone rubber. Suitable irradiation doses for cross-linking these copolymers are of the order of from about $100 \times 10^6$ to $1000 \times 10^6$ Roentgens. Preferably, this irradiation is provided by high energy electron bombardment as described and claimed in patent 2,763,609, Lawton et al., employing electrons having energies of from about 50,000 to 20,000,000 electron volts. The cross-linking of the polymers and copolymers described above results in the formation of silicone rubber.

Where chemical cross-linking is employed, any of the conventional free-radical cross-linking agents common to the silicone industry can be used. Typical cross-linking agents are, for example, benzoyl peroxide, di-alpha-cumyl peroxide, dichlorobenzoyl peroxide, t-butyl perbenzoate, zirconyl nitrate, etc. These cross-linking agents are added to the copolymers in an amount equal to from about 0.1 to 10% by weight, based on the weight of the copolymer, and the catalyzed mixture is heated at an elevated temperature until cross-linking is effected. A suitable curing cycle involves a first cure at a temperature of about 120 to 150° C. for about 15 to 30 minutes followed by a post-cure for about 16 hours at a temperature of about 150 to 250° C.

The cross-linking of the copolymers described above, whether by irradiation or chemical agents, can be effected in either the presence or absence of filler materials to produce silicone rubber. Among the many fillers which can be employed during the cross-linking of the copolymers described above are the various silica fillers such as silica aerogel, fumed silica and precipitated silica as well as other types of fillers usch as titanium dioxide, calcium silicate, ferric oxide, chromic oxide, cadmium sulfide, asbestos, glass fibers, calcium carbonate, carbon black, lithopone, talc, etc. Preferably, the filler employed in preparing this silicone rubber is a finely divided silica filler. The percentage of silica filler in the silicone rubber can vary within extremely wide limits. However, in general the fillers are employed in a ratio of from about 20 to 300 parts by weight filler per 100 parts by weight of the homopolymer or copolymer.

The silicone rubber described above is useful in all of those applications where conventional silicone rubber is useful and is particularly useful where resistance to irradiation is required, where flexibility and thermal stability at elevated temperatures are required and where resistance to conventional aliphatic hydrocarbon solvents is required. For example, these materials are satisfactory for use as gaskets for automotive transmission and as oven door seals and the like.

The following examples are illustrative of the practice of my invention and are not intended for purposes of limitation. All parts are by weight.

*Example 1*

To a solution of 16.1 parts of bis-(p-chlorophenyl)-dichlorosilane and 16 parts pyridine in 140 parts diethyl ether was added a solution of 20.7 parts of tetraphenyldisiloxanediol-1,3 in 70 parts diethyl ether. The reaction mixture was stirred during the addition and then allowed to stand for 3 hours during which time pyridine hydrochloride precipitated. This precipitate was removed by filtration and the diethyl ether was removed by evaporation. The resulting solids were dissolved in toluene and a small amount of pyridine hydrochloride precipitate was removed by filtration. The toluene was stripped from the reaction mixture and the resulting solids were recrystallized three times from a mixture of equal parts by volume of benzene and cyclohexane to produce 1,1-bis-(p-chlorophenyl)-3,3,5,5-tetraphenylcyclotrisiloxane having the formula:

(5)

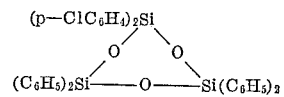

This material had a melting point of 206–207° C. The identity of the material was confirmed by infrared analysis which showed a peak at 12.3 microns corresponding to the p-substituted phenyl group, a peak at 9.8 microns corresponding to the cyclotrisiloxane ring and a doublet at 8.9 microns and a peak at 11.8 microns corresponding to the diphenylsiloxy units. Chemical analysis showed the presence of 9.4% Cl, 64.6% C, 4.3% H, and 11.8% Si, as compared with the theoretical values of 10.7% Cl, 65.2% C, 4.2% H, and 12.7% Si.

*Example 2*

About 7.5 parts of the cyclic material of Example 1 was heated to a temperature of 325° C. and maintained at a pressure of about 10 microns to remove any entrained air and moisture. At the end of about 30 minutes, a tough, transparent polymer was formed which consisted essentially of the following recurring structural units:

(6) 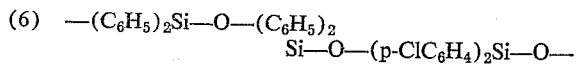

This polymer had in intrinsic viscosity of 0.52 deciliter per gram, a molecular weight of about 85,000 and contained about 130 of the units of Formula 6 per molecule. This polymer was a hard, solid material at room temperature and when heated to a temperature above 50° C. was a very viscous gum. This gum is used to encapsulate a transformer by forcing the gum at 75° C. into a container holding a transformer. Upon cooling of the container to room temperature (20° C.), the encapsulated transformer is removed from the container to provide a transformer encapsulated with a hard housing resistant to ionizing irradiation and the effect of aliphatic solvents.

*Example 3*

To a solution of 25 parts of phenyl-m-chlorophenyldichlorosilane and 25 parts of pyridine and 200 parts diethyl ether are added a solution of 40 parts of hexaphenyltrisiloxanediol-1,5 in 100 parts diethyl ether. The reaction mixture is stirred during the addition and allowed to stand for 16 hours during which time pyridine hydrochloride precipitates. The precipitate is removed by filtration and the diethyl ether is removed by evaporation. The resulting solids are dissolved in toluene and a small amount of precipitated pyridine hydrochloride is removed by filtration. The toluene is then stripped and the resulting solids are recrystallized three times from a mixture of equal parts by weight of benzene and cyclohexane to produce m-chlorophenylheptaphenylcyclotetrasiloxane having the formula:

(7) 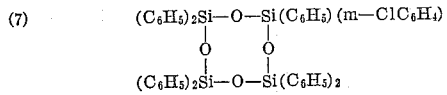

*Example 4*

A copolymer is prepared by heating a solution of one part of the m-chlorophenylheptaphenylcyclotetrasiloxane of Example 3 with one part by weight of 1,3,5,7-tetramethyl-1,3,5,7-tetravinylcyclotetrasiloxane in two parts of xylene at a temperature of 110° C. To the solution is added 0.1 part of a 0.5% by weight solution of potassium hydroxide in octamethylcyclotetrasiloxane. The mixture is allowed to remain at temperature for one hour during which time the two cyclic materials copolymerize to form a tough, transparent gum having a molecular weight greater than 500,000 and consisting of repeating units derived from each of the cyclotetrasiloxanes. A rubber is prepared from the resulting material by mixing 1.0 part of the material with 0.5 part of silica aerogel and 0.05 part of benzoyl peroxide and heating the resulting mixture at a temperature of 120° C. for 10 minutes with a postcure at 200° C. for 16 hours. The resulting silicone rubber is a strong, elastic material.

What I claim as new and desire to secure by Letters Patent of the United States is:

1. A cyclic polydiorganosiloxane having the formula:

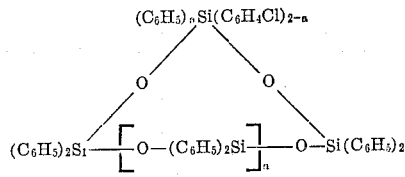

where $a$ and $n$ are whole numbers equal to from 0 to 1, inclusive.

2. The cyclic polysiloxane 1,1-bis-(p-chlorophenyl)-3,3,5,5-tetraphenylcyclotrisiloxane.

3. A linear polymer having a molecular weight of at least about 10,000 and consisting essentially of the following recurring structural units:

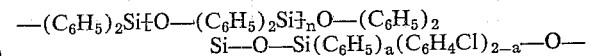

where $a$ and $n$ are whole numbers equal to from 0 to 1, inclusive.

4. A linear polymer having a molecular weight of at least about 10,000 and consisting essentially of the following recurring structural units:

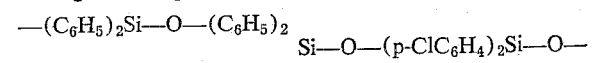

References Cited

UNITED STATES PATENTS

| | | | |
|---|---|---|---|
| 2,258,219 | 10/1941 | Rochow | 260—448.2 |
| 2,599,984 | 6/1952 | Fletcher et al. | 260—448.2 |
| 2,684,379 | 7/1954 | Guilissen et al. | 260—448.2 |
| 2,780,636 | 2/1957 | Wright et al. | 260—448.2 |
| 2,887,503 | 5/1959 | Holdstock | 260—448.2 |
| 2,954,391 | 9/1960 | Riley et al. | 260—448.2 |
| 3,011,987 | 12/1961 | Walton et al. | 260—448.2 |
| 3,037,962 | 6/1962 | Hartung et al. | 260—448.2 |
| 3,105,061 | 9/1963 | Bruner | 260—448.2 |
| 3,122,579 | 2/1964 | Leitheiser | 260—448.2 |

OTHER REFERENCES

Eaborn: "Organosilicon Compounds," Academic Press, Inc., New York, Publ. (1960), page 237.

Schott et al.: 53 Chem. Abstract 6125 (1959).

TOBIAS E. LEVOW, *Primary Examiner.*

SAMUEL H. BLECH, *Examiner.*

P. D. FREEDMAN, J. G. LEVITT, P. F. SHAVER, *Assistant Examiners.*